United States Patent
Levy et al.

(10) Patent No.: US 11,902,559 B2
(45) Date of Patent: Feb. 13, 2024

(54) DETECTION OF VIDEO TAMPERING

(71) Applicant: Intel Corporation, Santa Clara, CA (US)

(72) Inventors: Noam Levy, Karmiel (IL); Guy Ben-Artzi, Zichron Yaacov (IL)

(73) Assignee: Intel Corportation, Santa Clara, CA (US)

(*) Notice: Subject to any disclaimer, the term of this patent is extended or adjusted under 35 U.S.C. 154(b) by 728 days.

(21) Appl. No.: 16/865,708

(22) Filed: May 4, 2020

(65) Prior Publication Data

US 2020/0267404 A1 Aug. 20, 2020

(51) Int. Cl.
*H04N 19/467* (2014.01)
*H04N 19/176* (2014.01)
(Continued)

(52) U.S. Cl.
CPC ......... *H04N 19/467* (2014.11); *H04L 9/0643* (2013.01); *H04L 9/3249* (2013.01);
(Continued)

(58) Field of Classification Search
CPC .... H04N 19/467; H04N 19/176; H04N 19/18; H04N 21/23892; H04N 21/8358;
(Continued)

(56) References Cited

U.S. PATENT DOCUMENTS

| | | |
|---|---|---|
| 6,823,455 B1 | 11/2004 | Macy et al. |
| 2002/0094082 A1 | 7/2002 | Jones et al. |

(Continued)

FOREIGN PATENT DOCUMENTS

JP 2002252837 9/2002

OTHER PUBLICATIONS

Bestagini, P., et al. "Local tampering detection in video sequences", 2013 IEEE 15th International Workshop on Multimedia Signal Processing (MMSP), IEEE, Oct. 2013, 6 pages.
(Continued)

*Primary Examiner* — Brian F Shaw
(74) *Attorney, Agent, or Firm* — Hanley, Flight & Zimmerman, LLC (57) ABSTRACT

Techniques are provided for generation of secure video and tamper detection of the secure video. A methodology implementing the techniques according to an embodiment includes selecting a subset of macroblocks from a video frame to be transmitted and calculating a low frequency metric on each of the selected macroblocks. The method also includes performing a hash calculation on the low frequency metrics to generate a frame signature; encrypting the frame signature (using a private key) to generate an encrypted watermark; and modifying pixels of each of the selected macroblocks to generate the secured video frame, the modifications based on bits of the encrypted watermark that are associated with the selected macroblock. The method further includes authenticating a received video frame by comparing a calculated frame signature to an authenticated frame signature, the authenticated frame signature decrypted (using a public key) from an extracted watermark of the received video frame.

20 Claims, 7 Drawing Sheets

(51) Int. Cl.
 H04L 9/06 (2006.01)
 H04L 9/32 (2006.01)
(52) U.S. Cl.
 CPC ........ *H04N 19/176* (2014.11); *H04L 2209/34* (2013.01); *H04L 2209/608* (2013.01)
(58) Field of Classification Search
 CPC ... H04L 9/0643; H04L 9/3249; H04L 9/3247; H04L 9/3239; H04L 2209/34; H04L 2209/608; G06T 2201/0051; G06T 2201/0061; G06T 2201/0083; G06T 1/0028; G06T 1/0057; G06F 21/64
 See application file for complete search history.

(56) References Cited

U.S. PATENT DOCUMENTS

2002/0178368 A1* 11/2002 Yin .................... H04N 1/32299
 713/186
2008/0226121 A1 9/2008 Tewfik et al.

OTHER PUBLICATIONS

D'Avino, D, et al., "Autoencoder with recurrent neural networks for video forgery detection", arXiv:1708.08754v1, Aug. 29, 2017, 8 pages.

Ravi, H., et al., "Compression noise based video forgery detection", Reseach Gate, Conference Paper, Oct. 2014, 6 pages.

Rossler, A., et al., "Faceforensics: A large-scale video dataset for forgery detection in human faces", arXiv:1803.09179, Mar. 24, 2018, 21 pages.

European Patent Office, "Extended European Search Report," mailed in connection with European Patent Application No. 20216316.8, dated Apr. 15, 2021, 12 pages.

Queluz, "Spatial Watermark for Image Content Authentication," Journal of Electronic Imaging, 11(2), Apr. 2002, 11 pages.

Ho et al., "Digital Image-in-Image Watermarking for Copyright Protection of Satellite Images using the Fast Hadamard Transform," IEEE International Geoscience and Remote Sensing Symposium, Jun. 2002, 3 pages.

Han et al., "A Reversible Image Authentication Method without Memorization of Hiding Parameters," IEICE Transactions on Fundamentals, vol. E92-A, No. 10, Oct. 10, 2009, 8 pages.

Schneider et al., "A Robust Content Based Digital Signature for Image Authentication," IEEE Proceedings of the International Conference on Image Processing, Sep. 1998, 4 pages.

European Patent Office, "Communication pursuant to Article 94(3) EPC," mailed in connection with European Patent Application No. 20216316.8, dated Jun. 5, 2023, 8 pages.

Impulse Adventure, "JPEG Compression Quality from Quantization Tables," dated May 12, 2020, retrieved from <https://web.archive.org/web/20200512133927/www.impulseadventure.com/photo/jpeg-guantization.html> on Sep. 25, 2023, 19 pages.

* cited by examiner

Video Frame
115

| Selected Macroblock 300 | | | Selected Macroblock 310 | |
| --- | --- | --- | --- | --- |
| | Selected Macroblock 300 | Selected Macroblock 310 | | Selected Macroblock 300 |
| Selected Macroblock 300 | | Selected Macroblock 300 | | |
| Selected Macroblock 310 | | | Selected Macroblock 300 | Selected Macroblock 310 |
| | | Selected Macroblock 310 | | Selected Macroblock 300 |
| Selected Macroblock 300 | | | Selected Macroblock 300 | |
| Selected Macroblock 310 | Selected Macroblock 310 | Selected Macroblock 300 | | |
| | Selected Macroblock 300 | | | Selected Macroblock 310 |

LSB of pixel average = 0

LSB of pixel average = 1

DETECTION OF VIDEO TAMPERING

BACKGROUND

New methods for video processing, for example using deep learning techniques, allow for the creation of synthetic video sequences that are highly realistic. As such, it is possible to tamper with existing video to create so called "fake" video that is increasingly difficult, if not impossible, to distinguish from the original video sequence. When video is transferred from one party to another, both parties would like to be sure that the information received is an accurate representation of the information transmitted and was not tampered with by a third party. This is a challenging problem, especially when the video is transmitted over a lossy channel, using third party encoding/decoding compression techniques.

Although the following Detailed Description will proceed with reference being made to illustrative embodiments, many alternatives, modifications, and variations thereof will be apparent in light of this disclosure.

DETAILED DESCRIPTION

Techniques are provided for secure encoding and decoding of video frames to provide a capability for detection of video tampering. Although various types of tampering can be detected, the techniques are particularly useful in detecting tampering that occurs during transmission. As noted previously, advances in technology, such as artificial intelligence and deep learning, allow for the creation of synthetic video sequences that are highly realistic and enable bad actors to tamper with video during transmission to create so called "fake" video that is difficult to detect. The disclosed techniques provide confidence, to both the transmitting party and the receiving party, that the information received is an accurate representation of the information transmitted and was not tampered with by a third party. Embodiments of the present disclosure embed an encrypted signature or watermark in the video frames prior to transmission which can later be used to authenticate the received frame. The signature is embedded in a manner that is not subjectively visible in the image and is not modified by lossy video compression techniques that may be applied for video frame transmission.

The disclosed techniques can be implemented, for example, in a computing system or a software product executable or otherwise controllable by such systems, although other embodiments will be apparent. In one such embodiment, the system or product is configured to provide secure encoding of video frames for transmission over a channel and for secure decoding of the video frames at a receiver. The encoding and decoding provide for tamper detection/authentication of the received video frames. In accordance with such an embodiment, a methodology to implement these techniques includes selecting a subset of macroblocks from the video frame to be transmitted and calculating a low frequency metric on each of the selected macroblocks. The low frequency metric is chosen to be resistant to modification by video compression techniques that may be employed for the transmission of the video frames. The method also includes performing a hash calculation on the low frequency metrics to generate a frame signature; encrypting the frame signature (using a private key) to generate an encrypted watermark; and modifying pixels of each of the selected macroblocks to generate the secured video frame. The modifications are based on bits of the encrypted watermark that are associated with the selected macroblock such that the encrypted watermark is embedded or modulated into the image. The method further includes authenticating a video frame that is received over the channel. The authentication process includes comparing a frame signature, calculated directly from the received frame, to an authenticated frame signature, that is decrypted (using a public key) from the watermark that is extracted from the received frame. Thus, if the frame has been tampered with, the calculated frame signature will not match the authenticated frame signature.

As will be appreciated, the techniques described herein may provide an improved process for authentication of transmitted video, compared to existing techniques that either rely on video encoder metadata, make assumptions about video compression, or adversely affect image quality. The disclosed techniques can be implemented independently of any other processing operations that may be performed in the transmitter, the channel, or the receiver and can work with digital or analog transmission channels. The disclosed techniques can be implemented on a broad range of platforms including workstations, laptops, tablets, and smartphones. These techniques may further be implemented in hardware or software or a combination thereof.

System Architecture

Figure 1:
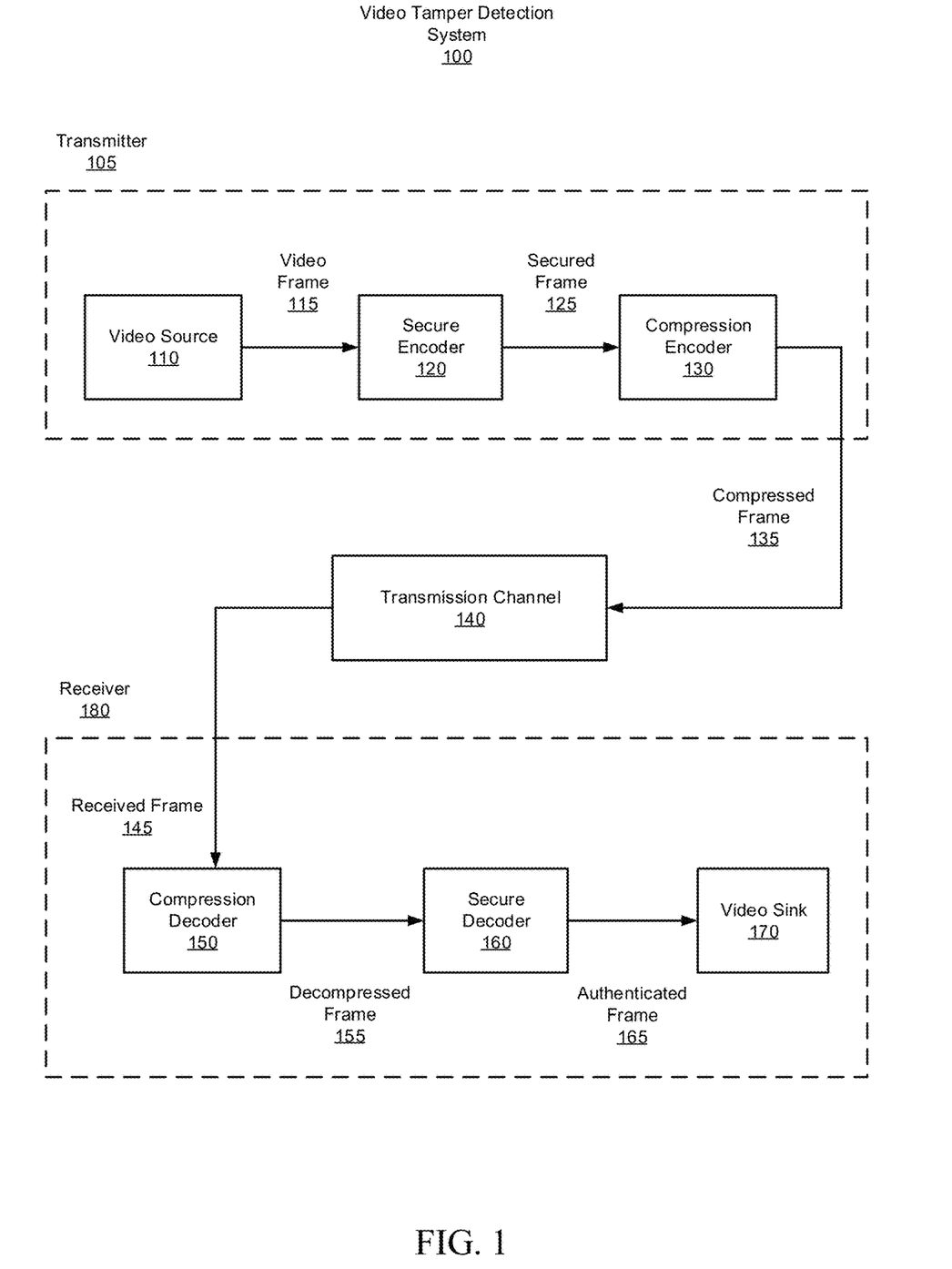
FIG. 1 is a high-level block diagram of a video tamper detection system, configured in accordance with an embodiment of the present disclosure.

FIG. 1 is a high-level block diagram of a video tamper detection system 100, configured in accordance with an embodiment of the present disclosure. The system 100 is shown to include a transmitter 105 and a receiver 180. The transmitter and receiver are connected by a transmission channel 140. In some embodiments channel 140 may be an internet connection. In some embodiments channel 140 may be an analog transmission channel. The transmitter side 105 is shown to include a video source 110, a secure encoder 120, and a compression encoder 130 (e.g., a codec). The receiver side 180 is shown to include a compression decoder 150 (e.g., a codec), a secure decoder 160, and a video sync 170.

On the transmitter side 105, the video source 110 may be a camera, a video storage system, or any suitable source of video content comprising a sequence of video frames 115 of any format. The secure encoder 120 is configured to generate secured frames 125 by embedding or modulating an encrypted signature or watermark into the video frames through manipulation of pixel values, as will be described in greater detail below. This watermark can later be used by the receiver 180 to authenticate the frames. The optional compression encoder 130 may be used to compress the secured video frames 125 into compressed frames 135 for increased transmission efficiency over channel 140 using any suitable compression technique.

On the receiver side 180, optional compression decoder 150 may be used to decompress the received frame 145 using any suitable decompression technique that is compatible with the compression performed by the transmitter 105. Secure decoder 160 is configured to decode the decompressed frame 155 to recover and validate the watermark, using an inverse of the encoder process, and authenticate the frame, as will be described in greater detail below. Video sink 170 is configured to receive the authenticated frame 165 for display, storage, or any other desired purpose.

In some embodiments, the transmission channel 140 may be a lossy channel, which is to say that video compression and decompression can be performed in a manner that is not lossless, for example using an H.264 or H.265 codec or other high efficiency video coding (HVEC) technique. These compression methods attempt to preserve video quality but provide no guarantee that any specific information is retained. The disclosed techniques, however, provide a relatively high probability that the embedded encrypted watermark will survive lossy compression and decompression.

Figure 2:
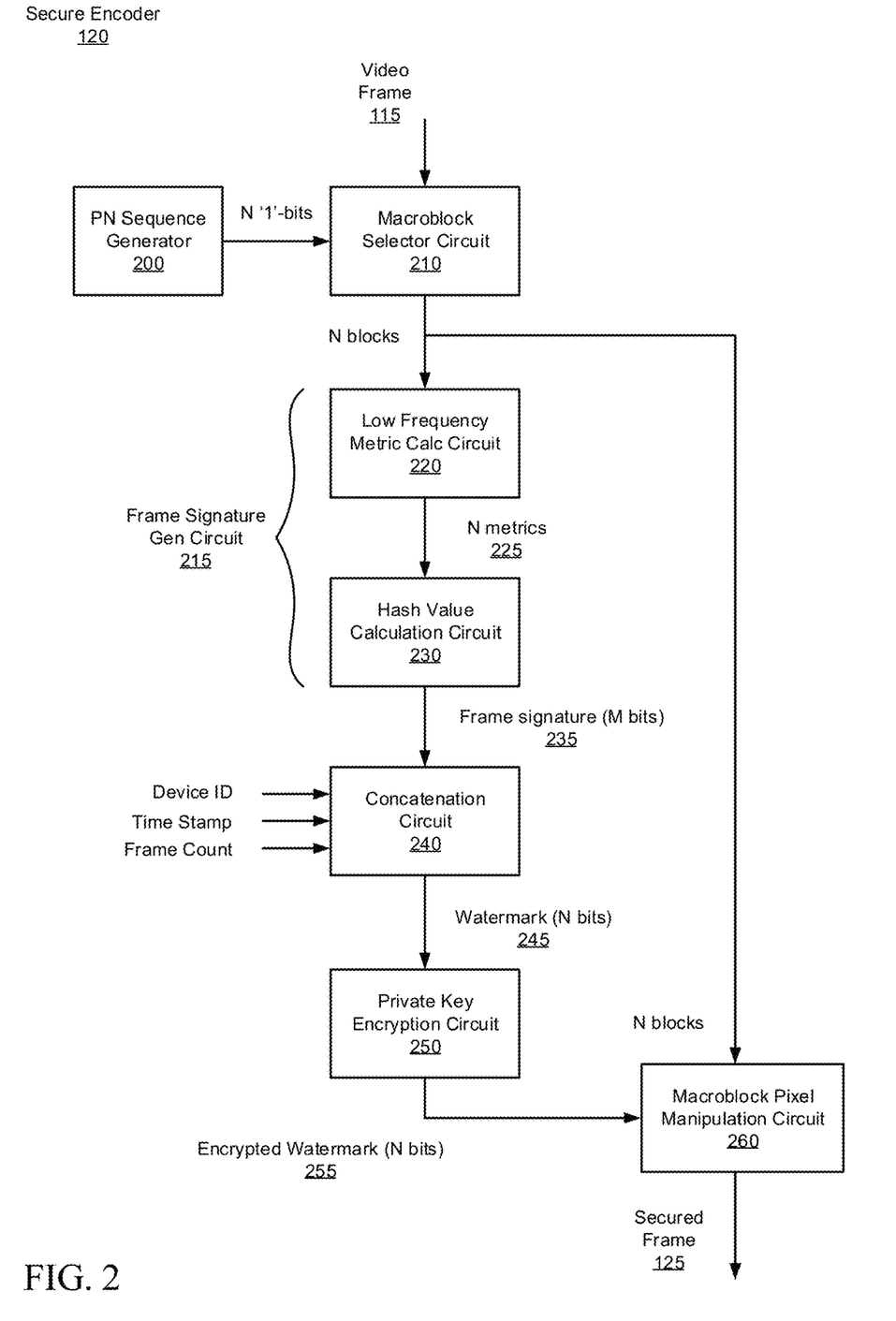
FIG. 2 is a block diagram of a secure encoder, configured in accordance with an embodiment of the present disclosure.

FIG. 2 is a block diagram of a secure encoder 120, configured in accordance with an embodiment of the present disclosure. The secure encoder 120 is shown to include a pseudo-noise (PN) binary sequence generator 200, a macroblock selector circuit 210, a frame signature generation circuit 215 (comprising a low frequency metric calculation circuit 220 and a hash value calculation circuit 230), a concatenation circuit 240, a private key encryption circuit 250, and a macroblock pixel manipulation circuit 260.

The PN sequence generator 200 is configured to generate a PN bit sequence (i.e., a random string of ones and zeros). The PN sequence generator may use any suitable random number generation algorithm that generates random values, in the range of zero and one, based on an initialization seed. The random number generation algorithm and the initialization seed are made public so that decoders on the receiving side of the channel can generate PN sequences that are identical to those used by the encoder.

The macroblock selector circuit 210 is configured to select a subset of macroblocks from a video frame to be transmitted. The selection is based on the PN bit sequence. For example, a bit equal to one can indicate selection of the macroblock associated with that bit in the sequence of bits. Of course, in some embodiments a zero bit could be used to indicate selection of the macroblock. The bit sequence comprises N bits that are set to one to select N macroblocks.

The frame signature generation circuit 215 is configured to generate a frame signature 235 using frame data that is substantially independent of video compression. In some embodiments, the frame data comprises a low frequency metric. According to such embodiments, the low frequency metric calculation circuit 220 is configured to calculate N low frequency metrics 225, one for each of the N selected macroblocks. Low frequency metrics are used because they are relatively independent of video compression. In particular, lossy compression methods tend to avoid modifications to the low frequency components because of the relatively high perceptual value of those components. In some embodiments, the low frequency metric is, for example, the DC component of the selected macroblock, or some other statistical representation of that selected macroblock that is not significantly altered by compression or that is otherwise independent of video compression. For example, in some embodiment, the low frequency metric is the average of the values of the pixels of the macroblock. Another embodiment may use the median of the values of the pixels of the macroblock, or the average of the values of the pixels of the macroblock after discarding the highest and/or lowest pixel values, or a sum of the values of the pixels of the macroblock, or a hash of the values of the pixels of the macroblock, or some other statistical or mathematical representation that is largely independent of video compression, or a combination of such statistical and/or mathematical representations, as will be appreciated. In some specific embodiments, the low frequency metric is a top-left (or near top-left) coefficient of the Hadamard Transform, Discrete Cosine Transform (DCT), or Integer Transform of the macroblock.

Such low frequency metrics are considered to be substantially independent or robust to video compression techniques that does not move the local average (or local low frequency metric) of pixels by more than one half of a magnitude level (after normalizing to the bit precision of the image). For example, with compression that uses DCT, the top-left DCT coefficient at (1,1) is eight times the average pixel value. Therefore, a JPEG quantization table with a top left value that is less than or equal to eight will not modify the average pixel value of the block by more than a half of a level. Most consumer grade cameras and video equipment employ quantization tables with a top left DCT value of less than four, and if the user selects a "high quality mode" the value is typically set to one. So, in the JPEG example, the disclosed techniques are resilient (substantially independent) to the typical compression performed by cameras. This is also true for other common image compression schemes.

Numerous other suitable low frequency metrics may be used. For simplicity, the average of the values of the pixels of the macroblock will be referred to for purposes of an example low frequency metric, but the present disclosure is not intended to be so limited.

The hash value calculation circuit 230 is configured to perform a hash calculation on the N low frequency metrics 225 to generate a frame signature 235 of M bits. In some embodiments, the hash value calculation circuit employs a Secure Hash Algorithm 128 (SHA-128).

The concatenation circuit 240 is configured to optionally concatenate additional fields including one or more of a device identifier (ID), a time stamp, and a frame count, to the frame signature 235 to generate a watermark 245 of N bits. Typically, the device ID identifies the device that is performing the encoding, the timestamp is provided by the video source 110 for each frame (e.g., using Simple Network Time Protocol), and the frame count is a sequential index of frames used to maintain the correct order of the frames in case they become unordered during transmission. The bit length M of the frame signature 235 is chosen so that the total bit length of the additional fields plus M results in a watermark of length N bits to correspond to the number of selected macroblocks. Thus, for example, if no additional fields are concatenated to the frame signature, then M would be equal to N.

The private key encryption circuit 250 is configured to encrypt the watermark 245 to generate an encrypted watermark 255, also of bit length N. The encryption employs a private key known only to the decoder on the transmitter side 105. In some embodiments, the encryption circuit employs a Rivest-Shamir-Adelman (RSA) encryption algorithm.

The macroblock pixel manipulation circuit 260 is configured to modify pixels of each of the N selected macroblocks, based on one of the N bits of the encrypted watermark 255 that are associated with the selected macroblock, to generate a secured video frame 125. In some embodiments (e.g., where the low frequency metric is the DC component of the macroblock), the pixel modification comprises adjusting randomly selected pixels of the selected macroblock by one gray scale level so that a least significant bit (LSB) of the average of the pixels equals the bit of the encrypted watermark that is associated with the selected macroblock. In some embodiments (e.g., where the low frequency metric is the Hadamard, DCT, or Integer Transform of the macroblock) the pixel modification comprises: the performing the forward transform, rounding the coefficient to the nearest value having the desired LSB value, and performing the inverse transform to recover the manipulated pixel value. In either case, the resulting secured video frame 125 has the encrypted watermark 225 embedded within it, through manipulation of the image in a manner that is not subjectively visible.

In some embodiments, the secure encoder 120 further comprises an error correction circuit to generate and append an error correction code of E bits in length to the encrypted watermark 255, prior to modification of the pixels. If the optional error correction code is used, then the additional E bits (for a total of N+E bits) will need to be embedded in the frame. Thus, N+E macroblocks will be selected and subject to pixel manipulation as described above. The error correction code is used to correct errors that can occur during transmission but is not part of the tamper detection process.

Figure 3:
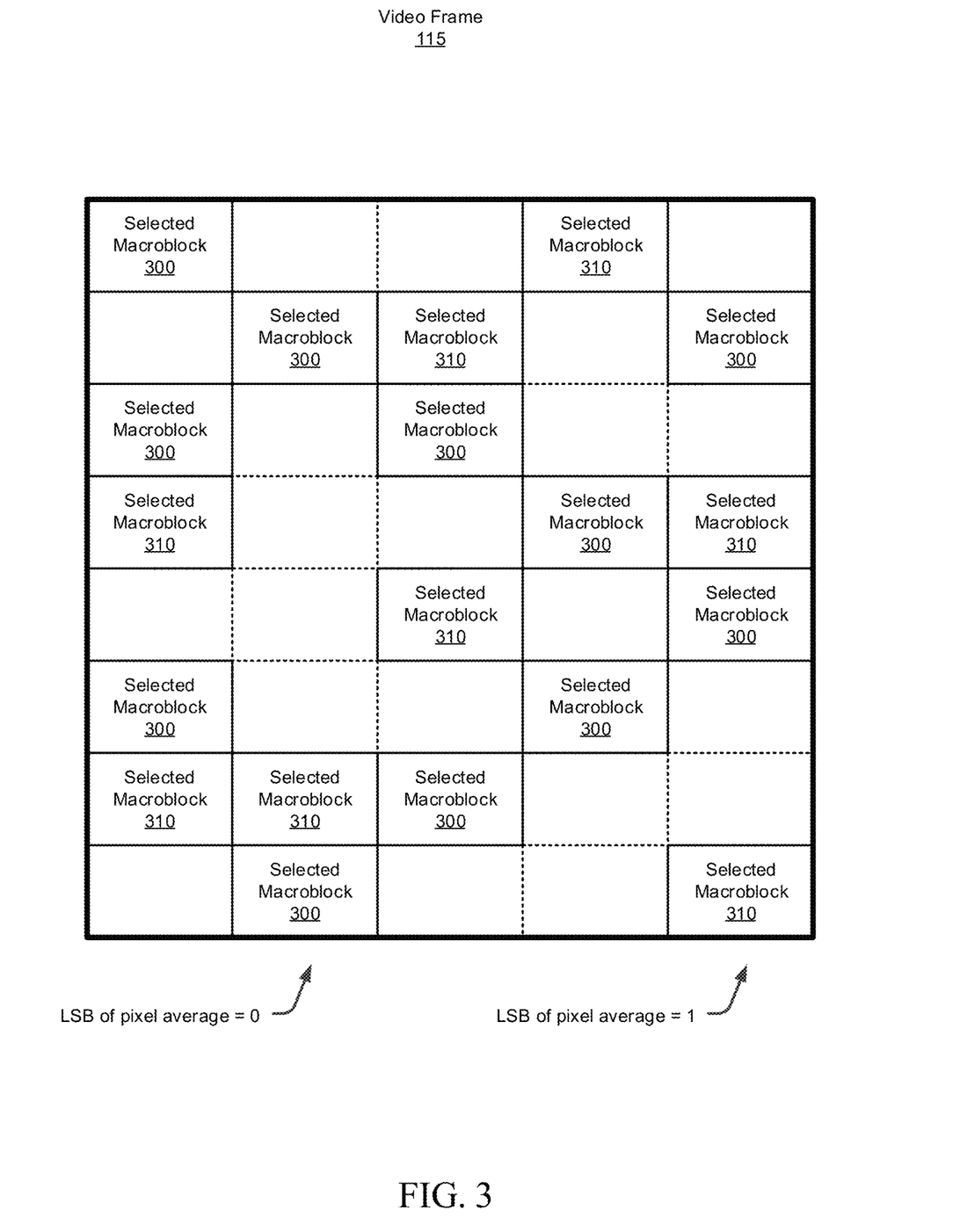
FIG. 3 illustrates selected macroblocks in a video frame, in accordance with an embodiment of the present disclosure.

FIG. 3 illustrates selected macroblocks in a video frame 115, in accordance with an embodiment of the present disclosure. The macroblocks are presented in an array of 5 by 7 blocks (for a total of 35 blocks) for convenience, but it will be appreciated that a video frame may typically comprise thousands of macroblocks. Also, 19 of the 35 macroblocks are shown to be selected macroblocks 300, 310 (e.g., selected based on the PN sequence), but in practice a smaller percentage of the macroblocks may be selected, for example in the range of 128, 256, or 512, although any number can be used. The pixels of selected macroblocks 300 have been adjusted so that the average of the pixel values in that block has an LSB set to zero. The pixels of selected macroblocks 310 have been adjusted so that the average of the pixel values in that block has an LSB set to one. The resulting sequence of zero LSBs and one LSBs, over all of the selected macroblocks, form the embedded encrypted watermark 255, as described previously.

Figure 4:
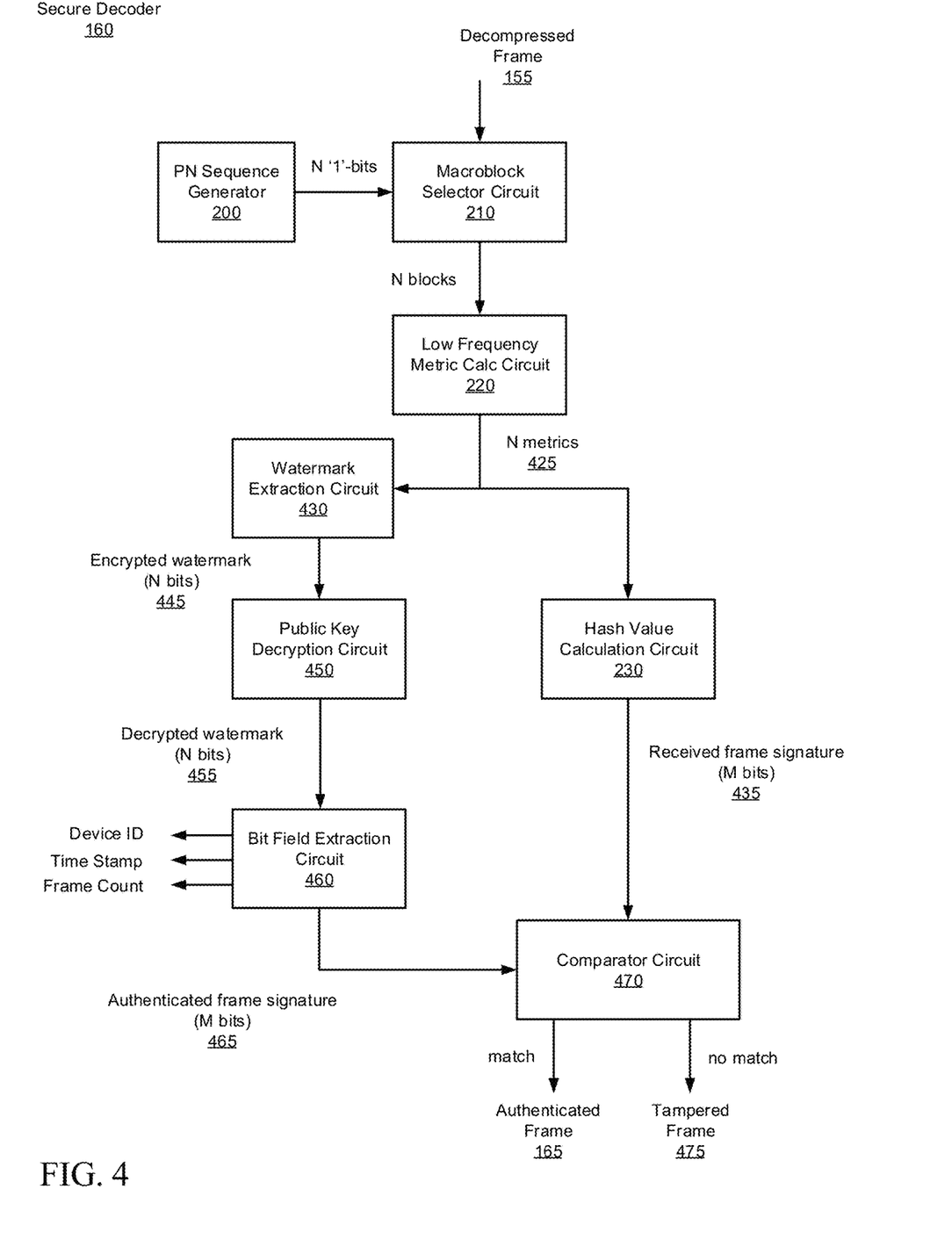
FIG. 4 is a block diagram of a secure decoder, configured in accordance with an embodiment of the present disclosure.

FIG. 4 is a block diagram of a secure decoder 160, configured in accordance with an embodiment of the present disclosure. The secure decoder 160 is shown to include a PN sequence generator 200, a macroblock selector circuit 210, a low frequency metric calculation circuit 220, a hash value calculation circuit 230, a watermark extraction circuit 430, a public key decryption circuit 450, a bitfield extraction circuit 460, and a comparator circuit 470.

The PN sequence generator 200 is configured to generate the PN bit sequence that was used for encoding, for example by using the same sequence generator and the same random number seed, as previously described.

The macroblock selector circuit 210 is configured to select a subset of macroblocks from the received (and decompressed) video frame 155. The selection is based on the PN bit sequence and thus the selected subset of macroblocks will be the same as the subset that was selected for encoding.

The low frequency metric calculation circuit 220 is configured to calculate N low frequency metrics 425, one for each of the N selected macroblocks of the received frame. The low frequency metric is the same metric that was used in the encoding process.

The hash value calculation circuit 230 is configured to perform a hash calculation on the N low frequency metrics 425 to generate a received frame signature 435 of length M bits. The hash calculation uses the same algorithm that was used in the encoding process, as previously described.

The watermark extraction circuit 430 is configured to obtain an encrypted watermark 445 from extracted bits of the low frequency metrics. In some embodiments, for example, the extracted bits are the LSBs of the metrics. The encrypted watermark 445 is of length N bits.

The public key decryption circuit 450 is configured to decrypt the encrypted watermark 445, using a public key, to generate a decrypted watermark 455, also of length N bits. The encryption algorithm is the same algorithm that was used in the encoding process, as previously described.

The bitfield extraction circuit 460 is configured to extract an authenticated frame signature, of length M bits, from the decrypted watermark 455 in cases where the decrypted watermark also includes one or more of a device identifier, a time stamp, and a frame count.

The comparator circuit 470 is configured to compare the authenticated frame signature 465 to the received frame signature 435. If the two signatures match, then the received frame is considered to be authenticated and valid 165. Otherwise, the received frame is considered to have been tampered with or otherwise compromised 475, in which case the frame can be rejected and/or the user can be warned.

Methodology

Figure 5:
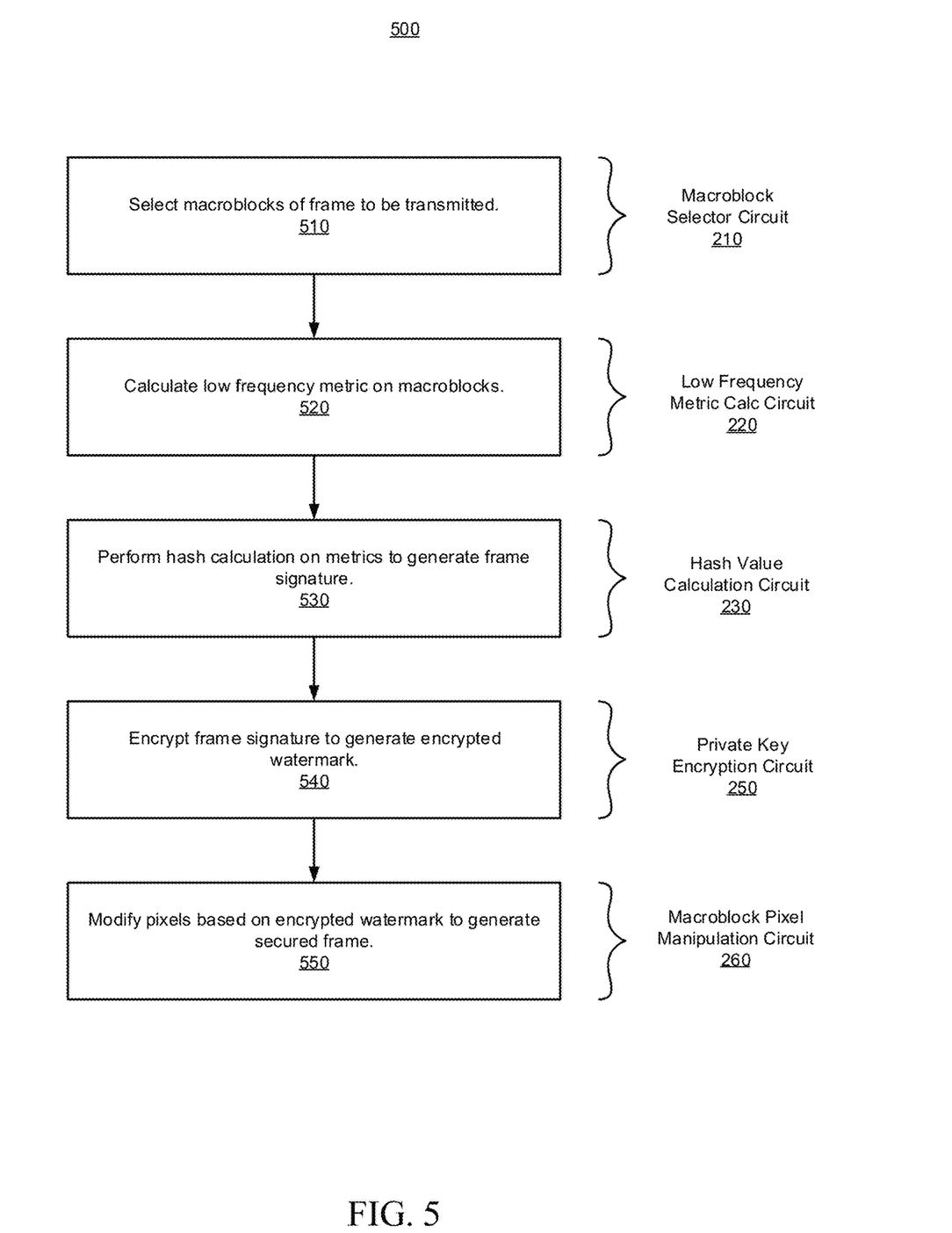
FIG. 5 is a flowchart illustrating a methodology for secure encoding of a video frame for tamper detection, in accordance with an embodiment of the present disclosure.
Figure 6:
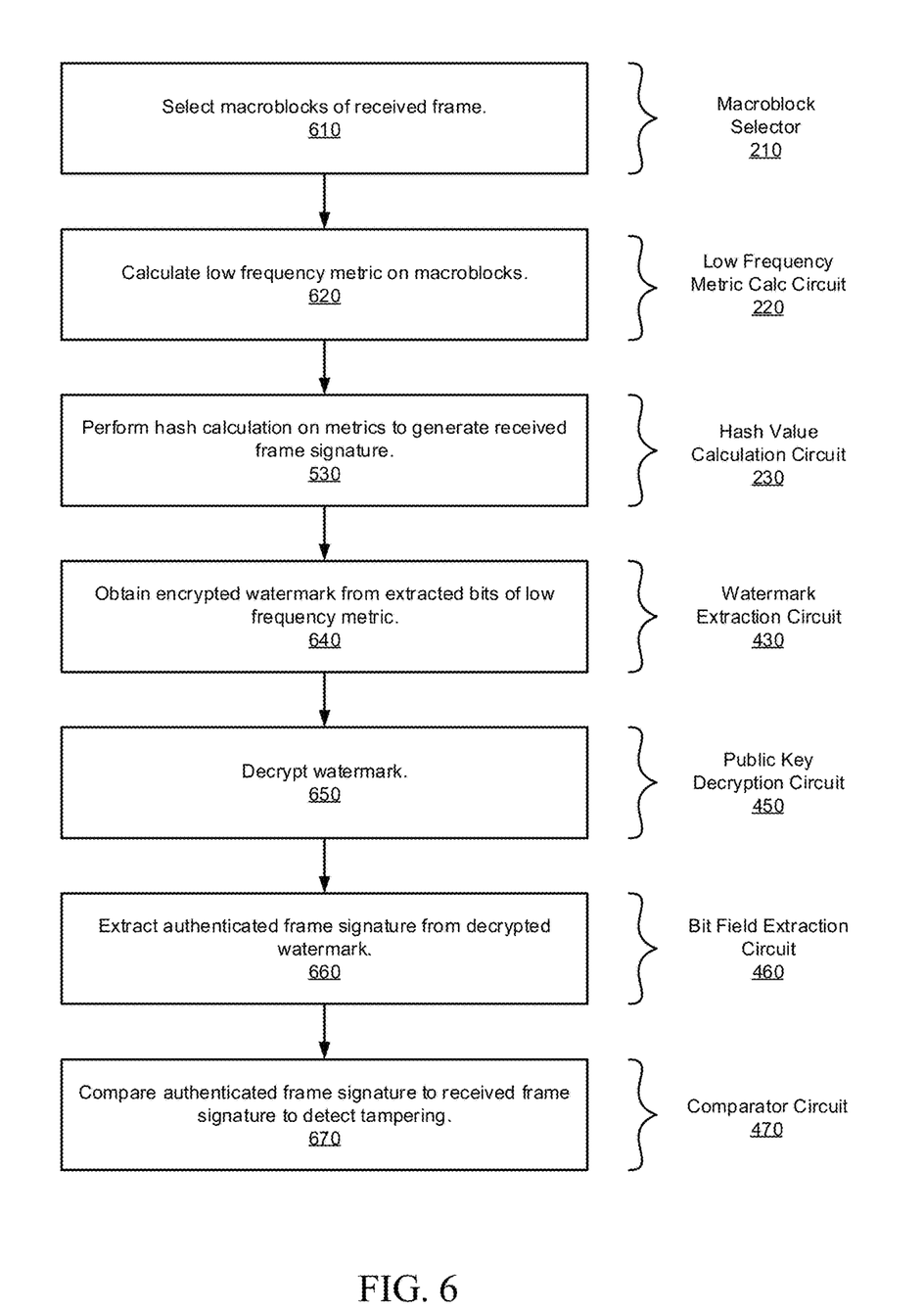
FIG. 6 is a flowchart illustrating a methodology for secure decoding of a video frame for tamper detection, in accordance with an embodiment of the present disclosure.

FIG. 5 is a flowchart illustrating a methodology 500 for secure encoding of a video frame for transmission with tamper detection capability, in accordance with an embodiment of the present disclosure. FIG. 6 is a flowchart illustrating a methodology for secure decoding 600 of the video frame to provide tamper detection capability, in accordance with an embodiment of the present disclosure. As can be seen, the example methods include a number of phases and sub-processes, the sequence of which may vary from one embodiment to another. However, when considered in the aggregate, these phases and sub-processes form a process for detection of video tampering, in accordance with certain of the embodiments disclosed herein. These embodiments can be implemented, for example, using the system architecture illustrated in FIGS. 1-4, as described above. However other system architectures can be used in other embodiments, as will be apparent in light of this disclosure. To this end, the correlation of the various functions shown in FIGS. 5 and 6 to the specific components illustrated in the other figures is not intended to imply any structural and/or use limitations. Rather, other embodiments may include, for example, varying degrees of integration wherein multiple functionalities are effectively performed by one system. For example, in an alternative embodiment a single module having decoupled sub-modules can be used to perform all of the functions of methods 500 and 600. Thus, other embodiments may have fewer or more modules and/or sub-modules depending on the granularity of implementation. In still other embodiments, the methodology depicted can be implemented as a computer program product including one or more non-transitory machine-readable mediums that when executed by one or more processors cause the methodology to be carried out. Numerous variations and alternative configurations will be apparent in light of this disclosure.

As illustrated in FIG. 5, in an embodiment, method 500 for secure encoding of a video frame to be transmitted with tamper detection capability, commences at operation 510, by selecting a subset of macroblocks from the video frame to be transmitted. In some embodiments, the macroblocks are selected based on a PN binary sequence (e.g., bits of the sequence that are equal to one select a macroblock).

Next, at operation 520, a low frequency metric is calculated on each of the selected macroblocks. The type of low frequency metric is chosen to be substantially independent of any video compression techniques that may subsequently be applied, as previously described. For example, in some embodiments, the low frequency metric is an average of the pixels of the selected macroblock.

At operation 530, a hash calculation is performed on the low frequency metrics to generate a frame signature. At operation 540, the frame signature is encrypted to generate an encrypted watermark. The encryption process employs a private key.

At operation 540, pixels of each of the selected macroblocks are modified or adjusted, to generate the secured video frame, based on bits of the encrypted watermark that are associated with that macroblock. For example, in some embodiments, randomly selected pixels of the selected macroblock are adjusted up or down by one gray level so that the LSB of the average of the pixels equals the bit of the encrypted watermark that is associated with that macroblock. Such an adjustment has a low frequency effect that is relatively unlikely to be modified by video compression techniques.

Of course, in some embodiments, additional operations may be performed, as previously described in connection with the system. For example, additional information such as a device identifier, a time stamp, and/or a frame count may be concatenated to the frame signature prior to encryption. In some embodiments, an error correction code may be appended to the encrypted watermark prior to modification of the pixels. In some embodiments, an RSA private key encryption algorithm and an SHA-128 hash algorithm are employed in the encoding process.

As illustrated in FIG. 6, in an embodiment, method 600 for secure decoding of a video frame for tamper detection commences at operation 610, by selecting a subset of macroblocks from a received video frame. In some embodiments, the macroblocks are selected based on the PN binary sequence that was used for encoding, for example by using the same sequence generator and the same random number seed.

Next, at operation 620, a low frequency metric is calculated on each of the selected macroblocks. The low frequency metric is the same metric that was used in the encoding process. For example, in some embodiments, the low frequency metric is an average of the pixels of the selected macroblock.

At operation 630, a hash calculation is performed on the low frequency metrics to generate a received frame signature. The hash calculation uses the same algorithm that was used in the encoding process.

At operation 640, an encrypted watermark is obtained from extracted bits of the low frequency metrics, for example, in some embodiments, the LSB of the metrics.

At operation 650, the encrypted watermark is decrypted, using a public key, to generate a decrypted watermark, and at operation 660, an authenticated frame signature is extracted from the decrypted watermark.

At operation 670, the authenticated frame signature is compared to the received frame signature. If the two signatures do not match, then the received frame can be considered to have been tampered with or otherwise compromised.

Of course, in some embodiments, additional operations may be performed, as previously described in connection with the system. For example, a device identifier, a time stamp, and/or a frame count may have been concatenated to the frame signature during encoding, and this data can be extracted and used for any desired purpose. In some embodiments, an error correction code may have been appended to the encrypted watermark during encoding, and this code can be extracted and employed to verify that the transmission was error-free or to correct any errors that are detected. In some embodiments, an RSA public key decryption algorithm and an SHA-128 hash algorithm are employed in the decoding process.

Example System

Figure 7:
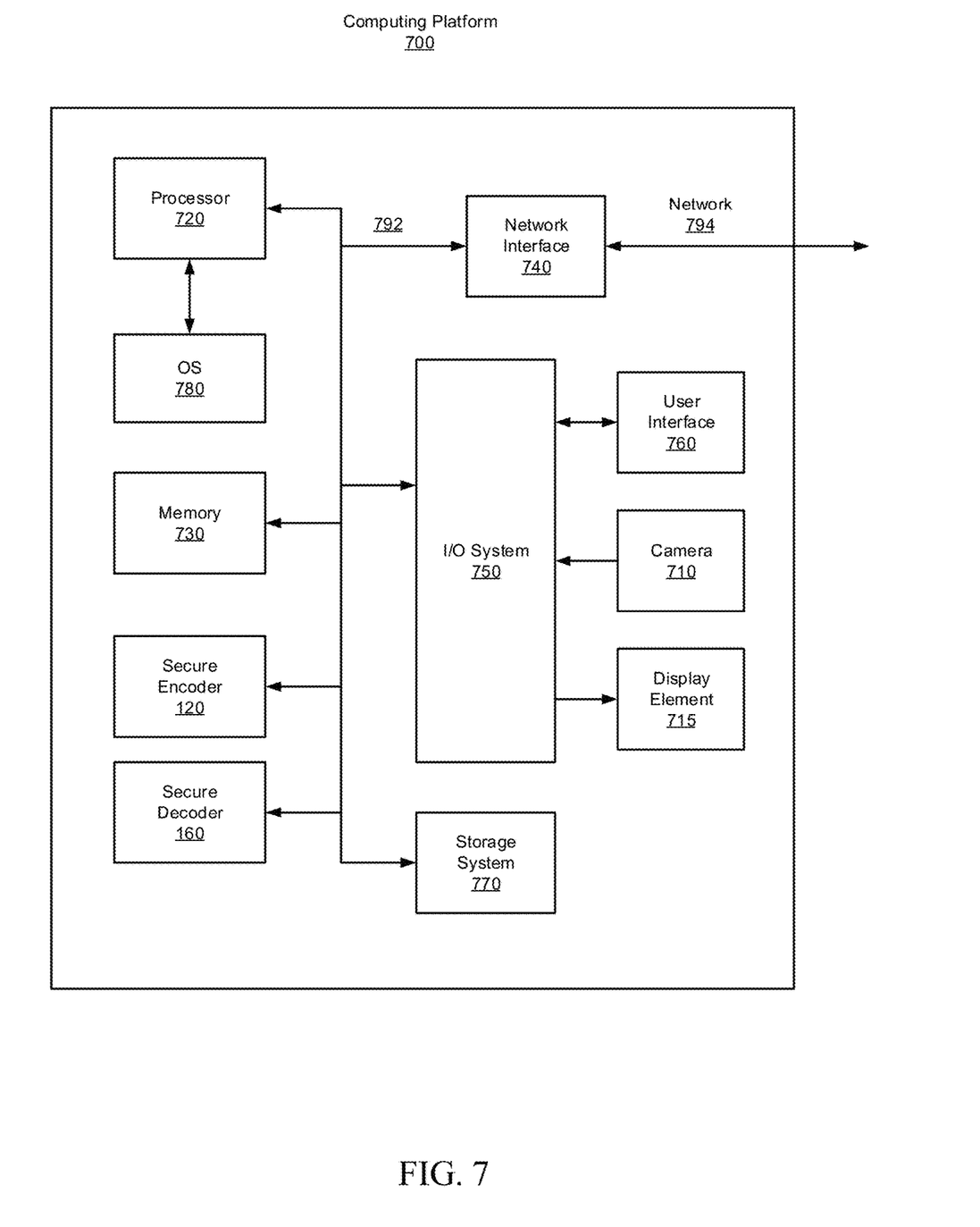
FIG. 7 is a block diagram schematically illustrating a computing platform configured to perform detection of video tampering, in accordance with an embodiment of the present disclosure.

FIG. 7 is a block diagram schematically illustrating an example computing platform 700 configured to perform detection of video tampering, in accordance with an embodiment of the present disclosure. In some embodiments, platform 700 may be hosted on, or otherwise incorporated into a personal computer, workstation, server system, laptop computer, ultra-laptop computer, tablet, touchpad, portable computer, handheld computer, palmtop computer, personal digital assistant (PDA), cellular telephone, combination cellular telephone and PDA, smart device (for example, smartphone, smart-speaker, or smart-tablet), mobile internet device (MID), messaging device, data communication device, wearable device, embedded system, home management system, and so forth. Any combination of different devices may be used in certain embodiments.

In some embodiments, platform 700 may comprise any combination of a processor 720, a memory 730, a secure encoder 120, a secure decoder 160, a network interface 740, an input/output (I/O) system 750, a user interface 760, a camera 710, a display element 715, and a storage system 770. As can be further seen, a bus and/or interconnect 792 is also provided to allow for communication between the various components listed above and/or other components not shown. Platform 700 can be coupled to a network 794 through network interface 740 to allow for communications with other computing devices, platforms, devices to be controlled, or other resources. Other componentry and functionality not reflected in the block diagram of FIG. 7 will be apparent in light of this disclosure, and it will be appreciated that other embodiments are not limited to any particular hardware configuration.

Processor 720 can be any suitable processor, and may include one or more coprocessors or controllers, such as an audio processor, a graphics processing unit, or hardware accelerator, to assist in control and processing operations associated with platform 700. In some embodiments, the processor 720 may be implemented as any number of processor cores. The processor (or processor cores) may be any type of processor, such as, for example, a microprocessor, an embedded processor, a digital signal processor (DSP), a graphics processor (GPU), a tensor processing unit (TPU), a network processor, a field programmable gate array or other device configured to execute code. The processors may be multithreaded cores in that they may include more than one hardware thread context (or "logical processor") per core. Processor 720 may be implemented as a complex instruction set computer (CISC) or a reduced instruction set computer (RISC) processor. In some embodiments, processor 720 may be configured as an x86 instruction set compatible processor.

Memory 730 can be implemented using any suitable type of digital storage including, for example, flash memory and/or random-access memory (RAM). In some embodiments, the memory 730 may include various layers of memory hierarchy and/or memory caches as are known to those of skill in the art. Memory 730 may be implemented as a volatile memory device such as, but not limited to, a RAM, dynamic RAM (DRAM), or static RAM (SRAM) device. Storage system 770 may be implemented as a non-volatile storage device such as, but not limited to, one or more of a hard disk drive (HDD), a solid-state drive (SSD), a universal serial bus (USB) drive, an optical disk drive, tape drive, an internal storage device, an attached storage device, flash memory, battery backed-up synchronous DRAM (SDRAM), and/or a network accessible storage device. In some embodiments, storage 770 may comprise technology to increase the storage performance enhanced protection for valuable digital media when multiple hard drives are included.

Processor 720 may be configured to execute an Operating System (OS) 780 which may comprise any suitable operating system, such as Google Android (Google Inc., Mountain View, Calif.), Microsoft Windows (Microsoft Corp., Redmond, Wash.), Apple OS X (Apple Inc., Cupertino, Calif.), Linux, or a real-time operating system (RTOS). As will be appreciated in light of this disclosure, the techniques provided herein can be implemented without regard to the particular operating system provided in conjunction with platform 700, and therefore may also be implemented using any suitable existing or subsequently developed platform.

Network interface circuit 740 can be any appropriate network chip or chipset which allows for wired and/or wireless connection between other components of platform 700 and/or network 794, thereby enabling platform 700 to communicate with other local and/or remote computing systems, servers, cloud-based servers, and/or other resources. Wired communication may conform to existing (or yet to be developed) standards, such as, for example, Ethernet. Wireless communication may conform to existing (or yet to be developed) standards, such as, for example, cellular communications including LTE (Long Term Evolution) and 5G, Wireless Fidelity (Wi-Fi), Bluetooth, and/or Near Field Communication (NFC). Exemplary wireless networks include, but are not limited to, wireless local area networks, wireless personal area networks, wireless metropolitan area networks, cellular networks, and satellite networks.

I/O system 750 may be configured to interface between various I/O devices and other components of platform 700. I/O devices may include, but not be limited to, user interface 760, camera 710, and display element 715. In some embodiments, the camera 710 may serve as the source of the video frames to be encoded and transmitted, and the display element 715 may be employed to display received, decoded, and authenticated video frames. User interface 760 may include devices (not shown) such as a touchpad, keyboard, and mouse, etc. I/O system 750 may include a graphics subsystem configured to perform processing of images for rendering on the display element. Graphics subsystem may be a graphics processing unit or a visual processing unit (VPU), for example. An analog or digital interface may be used to communicatively couple graphics subsystem and the display element. For example, the interface may be any of a high definition multimedia interface (HDMI), DisplayPort, wireless HDMI, and/or any other suitable interface using wireless high definition compliant techniques. In some embodiments, the graphics subsystem could be integrated into processor 720 or any chipset of platform 700.

It will be appreciated that in some embodiments, the various components of platform 700 may be combined or integrated in a system-on-a-chip (SoC) architecture. In some embodiments, the components may be hardware components, firmware components, software components or any suitable combination of hardware, firmware or software.

Secure encoder 120 is configured to encode video frames for transmission over a potentially lossy channel such that a secure decoder 160, on the receiving end of the channel, can detect video tampering, as described previously. Secure encoder 120 and secure decoder 160 may include any or all of the circuits/components illustrated in FIGS. 2 and 4, as described above. These components can be implemented or otherwise used in conjunction with a variety of suitable software and/or hardware that is coupled to or that otherwise forms a part of platform 700. These components can additionally or alternatively be implemented or otherwise used in conjunction with user I/O devices that are capable of providing information to, and receiving information and commands from, a user.

In some embodiments, these circuits may be installed local to platform 700, as shown in the example embodiment of FIG. 7. Alternatively, platform 700 can be implemented in a client-server arrangement wherein at least some functionality associated with these circuits is provided to platform 700 using an applet, such as a JavaScript applet, or other downloadable module or set of sub-modules. Such remotely accessible modules or sub-modules can be provisioned in real-time, in response to a request from a client computing system for access to a given server having resources that are of interest to the user of the client computing system. In such embodiments, the server can be local to network 794 or remotely coupled to network 794 by one or more other networks and/or communication channels. In some cases, access to resources on a given network or computing system may require credentials such as usernames, passwords, and/or compliance with any other suitable security mechanism.

In various embodiments, platform 700 may be implemented as a wireless system, a wired system, or a combination of both. When implemented as a wireless system, platform 700 may include components and interfaces suitable for communicating over a wireless shared media, such as one or more antennae, transmitters, receivers, transceivers, amplifiers, filters, control logic, and so forth. An example of wireless shared media may include portions of a wireless spectrum, such as the radio frequency spectrum and so forth. When implemented as a wired system, platform 700 may include components and interfaces suitable for communicating over wired communications media, such as input/output adapters, physical connectors to connect the input/output adaptor with a corresponding wired communications medium, a network interface card (NIC), disc controller, video controller, audio controller, and so forth. Examples of wired communications media may include a wire, cable metal leads, printed circuit board (PCB), backplane, switch fabric, semiconductor material, twisted pair wire, coaxial cable, fiber optics, and so forth.

Various embodiments may be implemented using hardware elements, software elements, or a combination of both. Examples of hardware elements may include processors, microprocessors, circuits, circuit elements (for example, transistors, resistors, capacitors, inductors, and so forth), integrated circuits, ASICs, programmable logic devices, digital signal processors, FPGAs, logic gates, registers, semiconductor devices, chips, microchips, chipsets, and so forth. Examples of software may include software components, programs, applications, computer programs, application programs, system programs, machine programs, operating system software, middleware, firmware, software modules, routines, subroutines, functions, methods, procedures, software interfaces, application program interfaces, instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power level, heat tolerances, processing cycle budget, input data rates, output data rates, memory resources, data bus speeds, and other design or performance constraints.

Some embodiments may be described using the expression "coupled" and "connected" along with their derivatives. These terms are not intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still cooperate or interact with each other.

The various embodiments disclosed herein can be implemented in various forms of hardware, software, firmware, and/or special purpose processors. For example, in one embodiment at least one non-transitory computer readable storage medium has instructions encoded thereon that, when executed by one or more processors, cause one or more of the methodologies disclosed herein to be implemented. The instructions can be encoded using a suitable programming language, such as C, C++, object-oriented C, Java, JavaScript, Visual Basic .NET, Beginner's All-Purpose Symbolic Instruction Code (BASIC), or alternatively, using custom or proprietary instruction sets. The instructions can be provided in the form of one or more computer software applications and/or applets that are tangibly embodied on a memory device, and that can be executed by a computer having any suitable architecture. In one embodiment, the system can be hosted on a given website and implemented, for example, using JavaScript or another suitable browser-based technology. For instance, in certain embodiments, the system may leverage processing resources provided by a remote computer system accessible via network 794. The computer software applications disclosed herein may include any number of different modules, sub-modules, or other components of distinct functionality, and can provide information to, or receive information from, still other components. These modules can be used, for example, to communicate with input and/or output devices such as a display screen, a touch sensitive surface, a printer, and/or any other suitable device. Other componentry and functionality not reflected in the illustrations will be apparent in light of this disclosure, and it will be appreciated that other embodiments are not limited to any particular hardware or software configuration. Thus, in other embodiments platform 700 may comprise additional, fewer, or alternative subcomponents as compared to those included in the example embodiment of FIG. 7.

The aforementioned non-transitory computer readable medium may be any suitable medium for storing digital information, such as a hard drive, a server, a flash memory, and/or random-access memory (RAM), or a combination of memories. In alternative embodiments, the components and/ or modules disclosed herein can be implemented with hardware, including gate level logic such as a field-programmable gate array (FPGA), or alternatively, a purpose-built semiconductor such as an application-specific integrated circuit (ASIC). Still other embodiments may be implemented with a microcontroller having a number of input/output ports for receiving and outputting data, and a number of embedded routines for carrying out the various functionalities disclosed herein. It will be apparent that any suitable combination of hardware, software, and firmware can be used, and that other embodiments are not limited to any particular system architecture.

Some embodiments may be implemented, for example, using a machine readable medium or article which may store an instruction or a set of instructions that, if executed by a machine, may cause the machine to perform a method, process, and/or operations in accordance with the embodiments. Such a machine may include, for example, any suitable processing platform, computing platform, computing device, processing device, computing system, processing system, computer, process, or the like, and may be implemented using any suitable combination of hardware and/or software. The machine readable medium or article may include, for example, any suitable type of memory unit, memory device, memory article, memory medium, storage device, storage article, storage medium, and/or storage unit, such as memory, removable or non-removable media, erasable or non-erasable media, writeable or rewriteable media, digital or analog media, hard disk, floppy disk, compact disk read only memory (CD-ROM), compact disk recordable (CD-R) memory, compact disk rewriteable (CD-RW) memory, optical disk, magnetic media, magneto-optical media, removable memory cards or disks, various types of digital versatile disk (DVD), a tape, a cassette, or the like. The instructions may include any suitable type of code, such as source code, compiled code, interpreted code, executable code, static code, dynamic code, encrypted code, and the like, implemented using any suitable high level, low level, object oriented, visual, compiled, and/or interpreted programming language.

Unless specifically stated otherwise, it may be appreciated that terms such as "processing," "computing," "calculating," "determining," or the like refer to the action and/or process of a computer or computing system, or similar electronic computing device, that manipulates and/or transforms data represented as physical quantities (for example, electronic) within the registers and/or memory units of the computer system into other data similarly represented as physical entities within the registers, memory units, or other such information storage transmission or displays of the computer system. The embodiments are not limited in this context.

The terms "circuit" or "circuitry," as used in any embodiment herein, are functional and may comprise, for example, singly or in any combination, hardwired circuitry, programmable circuitry such as computer processors comprising one or more individual instruction processing cores, state machine circuitry, and/or firmware that stores instructions executed by programmable circuitry. The circuitry may include a processor and/or controller configured to execute one or more instructions to perform one or more operations described herein. The instructions may be embodied as, for example, an application, software, firmware, etc. configured to cause the circuitry to perform any of the aforementioned operations. Software may be embodied as a software package, code, instructions, instruction sets and/or data recorded on a computer-readable storage device. Software may be embodied or implemented to include any number of processes, and processes, in turn, may be embodied or implemented to include any number of threads, etc., in a hierarchical fashion. Firmware may be embodied as code, instructions or instruction sets and/or data that are hard-coded (e.g., nonvolatile) in memory devices. The circuitry may, collectively or individually, be embodied as circuitry that forms part of a larger system, for example, an integrated circuit (IC), an application-specific integrated circuit (ASIC), a system-on-a-chip (SoC), desktop computers, laptop computers, tablet computers, servers, smartphones, etc. Other embodiments may be implemented as software executed by a programmable control device. In such cases, the terms "circuit" or "circuitry" are intended to include a combination of software and hardware such as a programmable control device or a processor capable of executing the software. As described herein, various embodiments may be implemented using hardware elements, software elements, or any combination thereof. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth.

Numerous specific details have been set forth herein to provide a thorough understanding of the embodiments. It will be understood by an ordinarily skilled artisan, however, that the embodiments may be practiced without these specific details. In other instances, well known operations, components and circuits have not been described in detail so as not to obscure the embodiments. It can be appreciated that the specific structural and functional details disclosed herein may be representative and do not necessarily limit the scope of the embodiments. In addition, although the subject matter has been described in language specific to structural features and/or methodological acts, it is to be understood that the subject matter defined in the appended claims is not necessarily limited to the specific features or acts described herein. Rather, the specific features and acts described herein are disclosed as example forms of implementing the claims.

Further Example Embodiments

The following examples pertain to further embodiments, from which numerous permutations and configurations will be apparent.

Example 1 is at least one non-transitory machine-readable storage medium having instructions encoded thereon that, when executed by one or more processors, cause a process to be carried out for generation of secure video, the process comprising: selecting a subset of macroblocks from a video frame to be transmitted; generating a frame signature using frame data that is independent of video compression; encrypting the frame signature to generate an encrypted watermark, the encryption employing a private key; and modifying one or more pixels of each of the selected macroblocks based on bits of the encrypted watermark that are associated with the selected macroblock, the modification to generate a secured video frame.

Example 2 includes the subject matter of Example 1, wherein the selection of the subset of macroblocks is based on bits of a pseudo-noise binary sequence.

Example 3 includes the subject matter of Examples 1 or 2, wherein generating the frame signature using frame data that is independent of video compression comprises: calculating a low frequency metric on each of the selected macroblocks, the low frequency metric independent of video compression; and performing a hash calculation on the low frequency metrics to generate the frame signature.

Example 4 includes the subject matter of any of Examples 1-3, wherein the low frequency metric comprises an average of the pixels of the selected macroblock.

Example 5 includes the subject matter of any of Examples 1-4, wherein the pixel modification comprises adjusting randomly one or more selected pixels of the selected macroblock by one gray level so that a least significant bit of the average of the one or more pixels equals the bit of the encrypted watermark that is associated with the selected macroblock.

Example 6 includes the subject matter of any of Examples 1-5, wherein the encryption employs a Rivest-Shamir-Adelman (RSA) encryption algorithm and the hash calculation employs a Secure Hash Algorithm 128 (SHA-128).

Example 7 includes the subject matter of any of Examples 1-6, wherein the process further comprises one or both of: concatenating one or more of a device identifier, a time stamp, and a frame count to the frame signature prior to encryption of the frame signature; and/or appending an error correction code to the encrypted watermark prior to modification of the pixels.

Example 8 is at least one non-transitory machine-readable storage medium having instructions encoded thereon that, when executed by one or more processors, cause a process to be carried out for detection of video tampering, the process comprising: selecting a subset of macroblocks from a received video frame; calculating a low frequency metric on each of the selected macroblocks, the low frequency metric independent of video compression; performing a hash calculation on the low frequency metrics to generate a received frame signature; obtaining an encrypted watermark from extracted bits of the low frequency metrics; decrypting the encrypted watermark to generate a decrypted watermark, the decryption employing a public key; extracting an authenticated frame signature from the decrypted watermark; and comparing the authenticated frame signature to the received frame signature to detect tampering of the received video frame.

Example 9 includes the subject matter of Example 8, wherein the selection of the subset of macroblocks is based on bits of a pseudo-noise (PN) binary sequence, the PN sequence used in the transmission of the received video frame.

Example 10 includes the subject matter of Examples 8 or 9, wherein the low frequency metric comprises an average of pixels of the selected macroblock.

Example 11 includes the subject matter of any of Examples 8-10, wherein the process further comprises extracting one or more of a device identifier, a time stamp, and a frame count from the decrypted watermark.

Example 12 includes the subject matter of any of Examples 8-11, wherein the process further comprises extracting an error correction code from the encrypted watermark.

Example 13 includes the subject matter of any of Examples 8-12, wherein the decryption employs a Rivest-Shamir-Adelman (RSA) decryption algorithm and the hash calculation employs a Secure Hash Algorithm 128 (SHA-128).

Example 14 is a system for generation of secure video, the system comprising: a macroblock selector circuit to select a subset of macroblocks from a video frame to be transmitted; a frame signature generation circuit to generate a frame signature using frame data that is independent of video compression; a hash value calculation circuit to perform a hash calculation on the low frequency metrics to generate a frame signature; an encryption circuit to encrypt the frame signature to generate an encrypted watermark, the encryption employing a private key; and a macroblock pixel manipulation circuit to modify one or more pixels of each of the selected macroblocks based on bits of the encrypted watermark that are associated with the selected macroblock, the modification to generate a secured video frame.

Example 15 includes the subject matter of Example 14, further comprising a pseudo-noise (PN) binary sequence generator to generate a PN bit sequence used to select the subset of macroblocks.

Example 16 includes the subject matter of Examples 14 or 15, wherein the frame signature generation circuit further comprises: a metric calculation circuit to calculate a low frequency metric on each of the selected macroblocks, the low frequency metric independent of video compression; and a hash value calculation circuit to perform a hash calculation on the low frequency metrics to generate the frame signature.

Example 17 includes the subject matter of any of Examples 14-16, wherein the low frequency metric comprises an average of the pixels of the selected macroblock.

Example 18 includes the subject matter of any of Examples 14-17, wherein the pixel modification comprises adjusting randomly one or more selected pixels of the selected macroblock by one gray level so that a least significant bit of the average of the one or more pixels equals the bit of the encrypted watermark that is associated with the selected macroblock.

Example 19 includes the subject matter of any of Examples 14-18, wherein the encryption circuit employs a Rivest-Shamir-Adelman (RSA) encryption algorithm and the hash value calculation circuit employs a Secure Hash Algorithm 128 (SHA-128).

Example 20 includes the subject matter of any of Examples 14-19, further comprising one or both of: a concatenation circuit to concatenate one or more of a device identifier, a time stamp, and a frame count to the frame signature prior to encryption of the frame signature; and/or an error correction circuit to generate and append an error correction code to the encrypted watermark prior to modification of the pixels.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents. Various features, aspects, and embodiments have been described herein. The features, aspects, and embodiments are susceptible to combination with one another as well as to variation and modification, as will be understood by those having skill in the art. The present disclosure should, therefore, be considered to encompass such combinations, variations, and modifications. It is intended that the scope of the present disclosure be limited not by this detailed description, but rather by the claims appended hereto. Future filed applications claiming priority to this application may claim the disclosed subject matter in a different manner, and may generally include any set of one or more elements as variously disclosed or otherwise demonstrated herein.

What is claimed is:

1. At least one non-transitory machine-readable storage medium comprising instructions to cause one or more processors to at least:
    select a subset of macroblocks from a video frame to be transmitted;
    generate a frame signature based on frame data associated with the video frame;
    encrypt the frame signature to generate an encrypted watermark, the encryption based on a private key; and
    modify modifying one or more pixels of ones of the subset of macroblocks based on bits of the encrypted watermark associated respectively with the ones of the subset of macroblocks to generate a secured video frame, the modification to include adjustment of one or more pixels of a first macroblock of the subset of macroblocks by one gray level to cause a least significant bit of an average of the one or more pixels of the first macroblock to correspond to a first bit of the encrypted watermark that is associated with the first macroblock.

2. The machine-readable storage medium of claim 1, wherein the instructions are to cause the one or more processors to select the subset of macroblocks based on bits of a pseudo-noise binary sequence.

3. The machine-readable storage medium of claim 1, wherein the instructions are to cause the one or more processors to generate the frame signature by:
    calculating low frequency metrics associated respectively with the ones of the subset of macroblocks; and
    performing a hash calculation on the low frequency metrics to generate the frame signature.

4. The machine-readable storage medium of claim 3, wherein the instructions are to cause the one or more processors to calculate a first one of the low frequency metrics based on an average of pixels of the first macroblock.

5. The machine-readable storage medium of claim 3, wherein the encryption employs a Rivest-Shamir-Adelman (RSA) encryption algorithm, and the hash calculation employs a Secure Hash Algorithm 128 (SHA-128).

6. The machine-readable storage medium of claim 1, wherein the instructions are to cause the one or more processors to:
    concatenate one or more of a device identifier, a time stamp, or a frame count to the frame signature prior to encryption of the frame signature.

7. The machine-readable storage medium of claim 1, wherein the instructions are to cause the one or more processors to:
    append an error correction code to the encrypted watermark prior to modification of the one or more pixels of the ones of the subset of macroblocks.

8. A system for generation of secure video, the system comprising:
    a macroblock selector circuit to select a subset of macroblocks from a video frame to be transmitted;
    a frame signature generation circuit to generate a frame signature based on frame data that is associated with the video frame;
    an encryption circuit to encrypt the frame signature to generate an encrypted watermark, the encryption based on a private key; and
    a macroblock pixel manipulation circuit to modify one or more pixels of ones of the subset of macroblocks based on bits of the encrypted watermark associated respectively with the ones of the subset of macroblocks to generate a secured video frame, the modification to include adjustment of one or more pixels of a first macroblock of the subset of macroblocks by one gray level to cause a least significant bit of an average of the one or more pixels of the first macroblock to correspond to a first bit of the encrypted watermark that is associated with the first macroblock.

9. The system of claim 8, further including a pseudo-noise (PN) binary sequence generator to generate a PN bit sequence used to select the subset of macroblocks.

10. The system of claim 8, wherein the frame signature generation circuit further includes:
   a metric calculation circuit to calculate low frequency metrics associated respectively with the ones of the subset of macroblocks; and
   a hash value calculation circuit to perform a hash calculation on the low frequency metrics to generate the frame signature.

11. The system of claim 10, wherein the metric calculation circuit is to calculate a first one of the low frequency metrics based on an average of pixels of the first macroblock.

12. The system of claim 10, wherein the encryption circuit employs a Rivest-Shamir-Adelman (RSA) encryption algorithm and the hash value calculation circuit employs a Secure Hash Algorithm 128 (SHA-128).

13. The system of claim 8, further including:
   a concatenation circuit to concatenate one or more of a device identifier, a time stamp, or a frame count to the frame signature prior to encryption of the frame signature.

14. The system of claim 8, further including:
   an error correction circuit to generate and append an error correction code to the encrypted watermark prior to modification of the one or more pixels of the ones of the subset of macroblocks.

15. A method for generation of secure video, the method comprising:
   selecting a subset of macroblocks from a video frame to be transmitted;
   generating a frame signature based on frame data associated with the video frame;
   encrypting the frame signature to generate an encrypted watermark, the encrypting based on a private key; and
   modifying one or more pixels of ones of the subset of macroblocks based on bits of the encrypted watermark associated respectively with the ones of the subset of macroblocks to generate a secured video frame, the modifying including adjusting one or more pixels of a first macroblock of the subset of macroblocks by one gray level to cause a least significant bit of an average of the one or more pixels of the first macroblock to correspond to a first bit of the encrypted watermark that is associated with the first macroblock.

16. The method of claim 15, wherein the selecting of the subset of macroblocks is based on bits of a pseudo-noise binary sequence.

17. The method of claim 15, wherein the generating of the frame signature includes:
   calculating low frequency metrics associated respectively with the ones of the subset of macroblocks; and
   performing a hash calculation on the low frequency metrics to generate the frame signature.

18. The method of claim 17, wherein the calculating of the low frequency metrics includes calculating a first one of the low frequency metrics based on an average of pixels of the first macroblock.

19. The method of claim 15, further including concatenating one or more of a device identifier, a time stamp, or a frame count to the frame signature prior to encryption of the frame signature.

20. The method of claim 15, further including appending an error correction code to the encrypted watermark prior to the modifying of the one or more pixels of the ones of the subset of macroblocks.

\* \* \* \* \*